Patented Mar. 22, 1949

2,465,072

UNITED STATES PATENT OFFICE 2,465,072

PLASTICIZED COMPOSITIONS

Bernard A. Dombrow, New York, and John J. Miskel, Brooklyn, N. Y., assignors to Nopco Chemical Company, Harrison, N. J., a corporation of New Jersey No Drawing. Application February 6, 1947, Serial No. 726,965

9 Claims. (Cl. 260—32.8)

This invention relates to plastic or elastic compositions of matter containing a rubber derivative, synthetic rubber or vinyl polymer plasticized with a condensed trimer of methyl amyl ketone or methyl hexyl ketone.

This application is a continuation in part of our application Serial No. 460,422, filed October 1, 1942, now abandoned. A portion of the subject matter disclosed herein is claimed in our concurrent copending application, Serial No. 726,966.

Elastomers and plastics or synthetic resins in general require the addition of plasticizers or softeners during the compounding thereof. These plasticizing agents serve to soften the uncured plastic compositions and thereby permit the incorporation of various other compounding materials and the calendering and molding of the final compound; to tackify the uncured compositions to insure adhesion and cohesion during milling, building operations and molding; and to render the finished or cured product flexible or elastic. In addition to performing the above functions a plasticizer must possess certain negative qualities. It must not deteriorate during processing, storage or use or induce deterioration of other constituents of the plastic composition; it must not bloom or sweat out of the uncured composition or the finished product; and must not evaporate from the finished product during the life thereof. Moreover, the plasticizing or softening agent must be inexpensive since it forms a substantial proportion of many plastics and elastomers. In view of these numerous desired qualities, the ideal all-purpose plasticizer has not yet been found and there is a considerable demand for improved plasticizers. This is particularly true with respect to the newly developed synthetic rubber-like polymers.

Accordingly, it is an object of this invention to provide improved elastomers and plastic compositions.

A second object is to provide rubber-like or plastic compositions which will not deteriorate during processing, storage, or use.

A third object of the invention is to provide plastic or elastomeric compositions containing substantially nonvolatile plasticizers or softeners.

A fourth object of the invention is to provide improved rubber derivatives, synthetic rubbers and polyvinyl compositions.

A fifth object of the invention is to provide synthetic rubber compositions which possess a high degree of tackiness in the uncured state.

Other objects of the invention will in part be obvious and will in part appear hereinafter.

The invention accordingly comprises novel compositions of matter which include rubber derivatives, synthetic rubbers and polyvinyl compounds plasticized with a nondrying trimer of methyl amyl ketone or methyl hexyl ketone. The trimer in question is produced by the condensation of the ketone by heating in the presence of a substantially anhydrous strong alkali catalyst.

The ketone trimer plasticizer when incorporated into rubber-like and plastic compositions imparts a high degree of softness and plasticity thereto during the processing thereof and remains in the cured product to render the same pliable under extreme conditions of cold. These plasticizers have high boiling points even under reduced pressures; hence they are nonvolatile for all practical purposes and remain in the finished product for the entire life thereof. Moreover, when blended into synthetic rubbery polymers, such as chloroprene, butadiene copolymers and the polysulfides, they render the compounded rubber highly tacky. In the past, it has been difficult to obtain the proper tack in such compositions and this characteristic serves to greatly facilitate compounding, ply-building and molding operations. To date, no compounding agent for either natural or artificial rubbers has been found to be incompatible with the condensed trimers of methyl amyl and methyl hexyl ketones. The trimer plasticizers may be substituted for known plasticizers or softeners in part or in whole. For example, in the case of chloroprene extrusion compounds it has been found desirable to add small quantities of the trimers in addition to the conventional softeners, as the Durometer hardness may be controlled by the quantity of ketone trimer employed.

The chemical structure of the plasticizers of this invention has not been definitely established; but the plasticizers are thought to be cyclic condensed trimers of the ketone starting material inasmuch as the condensation reaction cannot be forced beyond the trimeric stage in the presence of a strong alkali catalyst. Since aliphatic ketones can usually be reacted to tetramers and other higher linear polymers by employing the proper reaction conditions, it is believed that the methyl amyl and methyl hexyl ketones must form a closed ring when heated with a strong anhydrous alkali. Carbonates and hydroxides of sodium and potassium are suitable condensation catalysts. For each three moles of the ketone reactant, it appears that two moles of water are evolved, and this furnishes an excellent practical indication of the degree of completion of the reaction.

In an intermediate stage of the condensation, the reaction mixture is largely the ketone dimer, but continuing the reaction converts almost all of the dimer to the trimer. Any small quantity of dimer in the reaction products can be readily removed by distillation. This is desirable since the dimer is far inferior to the trimer as a plasticizer, because the lower polymer, despite its softening qualities, is more volatile and tends to bleed out of a plasticized composition more readily.

The trimers of methyl amyl and methyl hexyl ketones are somewhat unsaturated as evidenced by iodine numbers in the neighborhood of 27. From this it is believed that each trimer contains no more than one double bond. In comparison with other unsaturated compounds such as semi-drying oils having iodine values in excess of 100 and drying oils with still higher iodine numbers, it is clear that the condensed trimers used in the present invention fall into the nondrying category. Methyl hexyl ketone trimer shows no tendency to oxidize at elevated temperatures in the open air or in elastomers during vulcanization, therefore no deterioration in storage or in finished products is to be anticipated. In spite of the close relationship between the two ketone trimers, the methyl hexyl ketone polymer is greatly preferred as a plasticizer to that derived from the methyl amyl ketone as the former is less volatile and derived from less expensive source materials.

PREPARATION OF METHYL HEXYL KETONE TRIMER 10 pounds of 50% caustic soda solution as a condensation catalyst was stirred into 128 pounds (1 pound mole) of methyl hexyl ketone and heated in a vessel provided with a reflux condenser equipped with a water trap. When the reaction temperature reached 140° C. water started to collect in the watertrap. After a short while, the 5 pounds of water introduced in the aqueous caustic soda had been removed, and the reaction was therefore operating under anhydrous conditions for the major portion of the reaction period. Heating was continued until an additional 9.25 pounds (slightly more than ½ pound mole) of water had been trapped off, at which time the reaction temperature was observed to be 210° C. The condensation is thought to have taken place according to the following probable equation:

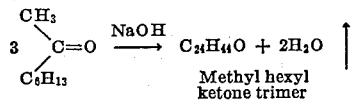

The reaction products were washed several times with 50 pound batches of water to remove the sodium hydroxide. It was not found necessary to employ a slightly acid final wash water to neutralize the reaction mixture. From 118.5 pounds of the washed residue of the reaction, 28.5 pounds of unreacted ketone was distilled off for use in subsequent batches leaving 90 pounds (a yield of almost 100% of theory based on the weight of ketone actually expended) of methyl hexyl ketone trimer containing approximately 1% of the dimer.

This final product was a pale yellow oily liquid boiling at 195° C./1.4 mm. and at 252–265° C./40 mm. and having an iodine value of 27 and a pour point of —55° C. Upon heating at 160° F. in an open dish for a period of 48 hours, no change in pour point was observed.

PREPARATION OF METHYL AMYL KETONE TRIMER

Methyl amyl ketone trimer was prepared from the ketone monomer in substantially quantitative yields by following the same procedure as for methyl hexyl ketone trimer. This product was found to have a boiling point in the range 220–230° C./39 mm. and an iodine value of the approximate order of the methyl hexyl ketone trimer.

The base materials of the novel plasticized compositions include natural rubber, reclaimed rubber, hydrogenated rubber, chlorinated rubber, rubber hydrochloride, polychloroprene, butadiene-stryrene copolymers, butadiene-isobutylene copolymers, butadiene-acrylonitrile copolymers, butadiene-acrylonitrile-ketone copolymers, polysulfide, rubbers, polyvinyl chloride, polyvinyl acetate, polyvinyl chloride-acetate copolymers, ester gums, cumarone-indene resins, ethyl cellulose plastics with an ethoxy content of at least 48.5%, and the like, and compatible mixtures thereof. The trimers of methyl amyl and methyl hexyl ketones are compatible with the aforementioned base materials in all proportions; but when excessive quantities of the trimer softener are incorporated into a plastic, the product will sweat out the plasticizer or be too soft for practical purposes.

As is the case with all other plasticizers, no ideal proportion of plasticizer to base material can be stated for all of the plastic or elastomeric materials mentioned. Each species of plastic or elastomer appears to have its own maximum plasticizer content beyond which bleeding or other undesirable effects are noted. In addition, the use of the plastic or rubbery product will determine the optimum softener content. Therefore, the only practical method for ascertaining that quantity is by experiment.

The examples below do not always indicate preferred proportions of plasticizer and plastic or elastomer, for some represent experiments made in determining extreme quantities of trimer which could be incorporated into a plastic composition without producing bleeding. Any amount of plasticizer smaller than the extreme will of course be completely compatible with the plastic or elastomer and will yield a plasticizing effect in proportion to the quantity used. Much smaller proportions of the plasticizing trimer are used for making relatively rigid polyvinyl chloride and chloride-acetate articles than for producing elastic or highly flexible materials. In a number of instances the novel compositions containing one of the trimers displayed a plasticity or elasticity attainable with the same base material in the prior art only by the use of a substantially greater quantity of a conventional plasticizer. Nevertheless, the quantities of plasticizer employed in the prior art provide a fairly good guide to desirable ratios of ketone trimer to base material. Tables A and B set forth the general and preferred proportions of the trimer and the plastic or elastomer base material.

For a fuller understanding of the nature and objects of the invention, reference should be had to the following examples which merely illustrate the invention and are not to be construed in a limiting sense; all proportions are given as parts by weight.

Example I

*Natural rubber*

| | Parts |
|---|---|
| Smoked sheet | 20 |
| Tire reclaim | 20 |
| Trimer of methyl hexyl ketone | 10 |
| Zinc oxide | 1 |
| Clay | 10 |
| Whiting | 37 |
| Sulfur | 1 |
| Diphenylguanidine | 1 |
| | 100 |

The above ingredients were compounded on a mill in the order in which they are listed. The resultant composition was readily and smoothly extruded on a tubing machine. After the extruded composition was cured at 375° F. for 15 minutes, a product was obtained which was highly flexible even at low temperatures and which did not show any bleeding out of the condensation product.

Example II

*Chloroprene*

| | Parts |
|---|---|
| Polychloroprene—"E" grade [1] | 38.3 |
| Trimer of methyl hexyl ketone | 15.3 |
| Magnesia | 3.8 |
| Clay | 38.3 |
| Zinc oxide | 1.9 |
| Stearic acid | 1.2 |
| Sulfur | 1.2 |
| | 100.0 |

[1] Manufactured by E. I. du Pont de Nemours and Company.

The above ingredients were compounded on a mill in the order listed to produce a very plastic mass which exhibited an unusually high degree of tack and superior calendering characteristics in comparison with the usual polychloroprene compositions. This material was molded into the form of a shallow tray in a closed mold at 324° F. for 28 minutes. The resultant product was readily stripped from the mold, showing no sign of lamination or flow marks, and upon storage exhibited no tendencies toward bleed or other deterioration. To obtain good vulcanizates from mixtures containing a ketone trimer, the incorporation of a small percentage of sulfur is recommended.

Example III

*Chloroprene extrusion composition*

| | Parts |
|---|---|
| Polychloroprene—"E" grade [1] | 48.0 |
| Trimer of methyl hexyl ketone | 1.0 |
| Magnesium oxide | 4.8 |
| Rosin | 1.2 |
| Stearic acid | 2.4 |
| Whiting | 24.0 |
| Carbon black | 2.4 |
| Petrolatum | 2.4 |
| Zinc oxide | 4.8 |
| Pine tar | 2.4 |
| Clay | 6.0 |
| Sulphur | 0.6 |
| | 100.0 |

[1] Manufactured by E. I. du Pont de Nemours and Company.

The substances listed were compounded in conventional manner and then molded by a known extrusion process. Here the ketone trimer was utilized in addition to usual proportions of conventional softeners for chloroprene. It was found that the milling, extrusion and molding properties of the stock were distinctly superior to those observed when working with a composition differing only in the omission of the methyl hexyl ketone trimer; for smoother tubing operation and good flow in the curing mold were noted, and rejects caused by spotty molding were eliminated. The finished articles possessed a highly satisfactory rubbery texture.

Example IV

*Butadiene-styrene*

| | Parts |
|---|---|
| Butadiene-styrene copolymer rubber | 50.0 |
| Trimer of methyl hexyl ketone | 20.0 |
| Channel black | 25.5 |
| Zinc oxide | 2.5 |
| Stearic acid | 0.5 |
| Benzothiazyl disulfide | 0.5 |
| Sulfur | 1.0 |
| | 100.0 |

The synthetic rubber was broken down on a tight mill with water-cooling of the rolls. The Channel black and condensate were then mixed together to form a paste and incorporated into the mass, after which the other ingredients were added in the order in which they are listed. The resultant mass exhibited a very satisfactory tack and plasticity. After a tray was molded from the batch as in Example II and cured for 12 minutes at 324° F., the finished article was readily stripped from the mold although no mold lubricant was employed. The vulcanizate was elastic, flexible at —50° C. and exhibited no trace of bloom either then or during prolonged storage.

Example V

*Butadiene-acrylonitrile*

| | Parts |
|---|---|
| Butadiene-acrylonitrile copolymer rubber | 50.0 |
| Zinc oxide | 2.5 |
| Stearic acid | 0.5 |
| Trimer of methyl hexyl ketone | 15.0 |
| Carbon black | 30.0 |
| Benzothiazyl disulfide | 0.5 |
| Diphenylguanidine | 0.5 |
| Sulfur | 1.0 |
| | 100.0 |

The above constituents were compounded on a mill in the order named. The resultant mass, which was satisfactorily tacky and plastic, was moulded into a tray as described in the preceding examples. It was found that the cured product remained flexible at temperatures as low as —50° C. and possessed the same excellent properties characterizing the articles of the preceding examples.

Example VI

*Butadiene-isobutylene*

| | Parts |
|---|---|
| Butadiene-isobutylene copolymer rubber (containing 5% zinc oxide and 1.5% sulfur) | 61.0 |
| Stearic acid | 0.9 |
| Trimer of methyl hexyl ketone | 6.5 |
| Carbon black | 31.0 |
| Tetramethyl thiuram disulfide | 0.6 |
| | 100.0 |

These ingredients were compounded on a mill, and molded into a tray as in the preceding examples, the cure being carried out at 324° F. for 50 minutes. The vulcanizate was free of flow marks and was satisfactorily flexible and elastic.

EXAMPLE VII

*Polysulfide rubber*

| | Parts |
|---|---|
| Polysulfide rubber—"FA" grade [1] | 43.38 |
| Trimer of methyl hexyl ketone | 4.35 |
| Carbon black | 26.10 |
| Zinc oxide | 4.30 |
| Stearic acid | 21.70 |
| Benzothiazyl disulfide | 0.13 |
| Diphenylguanidine | 0.04 |
| | 100.00 |

[1] Manufactured by the Thiokol Corporation.

The foregoing ingredients were compounded on a cold, tightset mill. First, the polysulfide rubber was preliminarily broken down on a tight cold roll for 5 minutes, then the ketone condensate and a portion of the carbon black were mixed into a paste and incorporated into the artificial rubber. Thereafter the remaining components were added separately and in the order in which they are listed to produce an uncured mix of excellent milling characteristics which was plastic and tacky and which was formed under pressure at 324° F. for 15 minutes. After cooling in the mold, it was observed that the product was elastic and flexible and showed no sign of bleed or other deterioration upon aging. In the past polysulfide rubbers have usually been difficult to mill due to the insufficient tackiness produced by the common plasticizers.

EXAMPLE VIII

*Butadiene-acrylonitrile-ketone rubber*

| | Parts |
|---|---|
| Rubber-like copolymer of 1,3 butadiene, acrylonitrile and methyl isopropenyl ketone—"RD" grade [1] | 55.4 |
| Carbon black | 22.2 |
| Trimer of methyl hexyl ketone | 16.7 |
| Zinc oxide | 2.8 |
| Stearic acid | 0.5 |
| Benzothiazyl disulfide | 0.5 |
| Anti-oxidant | 1.1 |
| Sulfur | 0.8 |
| | 100.0 |

[1] Manufactured by the Thiokol Corporation.

The procedure of Example VII was carefully followed in compounding the above materials. After the mixture was formed under pressure for 15 minutes at 324° F., it was cooled in the mold. The resultant product stripped readily from the mold and displayed only a very slight, unobjectionable bloom.

EXAMPLE IX

| | Parts |
|---|---|
| Polyvinyl chloride—"QYNA" grade [1] | 50 |
| Methyl amyl ketone trimer | 50 |
| Solvent, methyl ethyl ketone. | |

[1] Manufactured by Carbide and Carbon Chemicals Company.

The vinyl compound and trimer were blended by being dissolved completely in a suitable quantity of the solvent. All of the solvent was then removed by evaporation in a shallow dish to form a thin film. Upon examination the film proved to be tough, elastic, translucent and dry; no evidence of sweating of the trimer was apparent. These characteristics were unchanged after six weeks, and chilling to −50° C., did not seem to appreciably affect the flexibility and elasticity of the product.

EXAMPLE X

| | Parts |
|---|---|
| Polyvinyl chloride—"QYNA" grade (containing 1 part lead stearate) | 50 |
| Methyl hexyl ketone trimer | 50 |
| Solvent, methyl ethyl ketone. | |

The procedure of the preceding example was followed and substantially identical results were obtained. The small proportion of lead stearate was used to prevent discoloration of the film from heat. No bleeding of the trimer was apparent when the film was maintained at 70° C. for two weeks. The compounding was repeated in the absence of solvent by using the usual rubber mill to accomplish compounding. The results were identical with those obtained by depositing a plasticized film from solvent.

EXAMPLE XI

The composition of Example X was prepared with the lead stearate omitted. In appearance and elasticity, the two films were identical.

EXAMPLE XII

| | Parts |
|---|---|
| Polyvinyl chloride—"QYNA" grade (containing 0.18 part of litharge-PbO) | 60 |
| Methyl hexyl ketone trimer | 40 |
| Solvent, methyl ethyl ketone. | |

A film was prepared according to Example IX and found to have the same general properties as the polyvinyl films mentioned above but was somewhat stiffer. The intended function of the litharge was to minimize deterioration from heat. Upon heating the film to 142° C., no sweating of the trimer plasticizer was noted. The compounding was repeated in the presence of solvent by using a rubber mill for compounding. The results were identical with those obtained by depositing a plasticized film from solvent.

EXAMPLE XIII

| | Parts |
|---|---|
| Polyvinyl chloride—"QYNA" grade | 40 |
| Methyl hexyl ketone trimer | 60 |
| Solvent, methyl ethyl ketone. | |

The ingredients listed were compounded in the same way as in the preceding examples, and the only differences observed in the resulting film were enhanced flexibility and elasticity. Accelerated aging for two weeks at 70° C. caused no bleeding of the trimer from the film.

EXAMPLE XIV

| | Parts |
|---|---|
| Polyvinyl chloride-acetate—"VYNW" grade [1] | 50 |
| Methyl hexyl ketone trimer | 50 |
| Solvent, acetone. | |

[1] A copolymer of vinyl chloride and vinyl acetate manufactured by Carbide & Carbon Chemicals Co. and having a vinyl chloride content of 90 to 95%.

By following the steps of Example IX a film of substantially the same physical characteristics was obtained with the source materials listed here:

EXAMPLE XV

| | Parts |
|---|---|
| Polyvinyl chloride-acetate—"VYNW" grade | 50 |
| Methyl amyl ketone trimer | 50 |
| Solvent, acetone. | |

The experiment amounted to a duplication of Example XIV except for substitution of a different plasticizer, and the product appeared substantially the same:

EXAMPLE XVI

| | Parts |
|---|---|
| Polyvinyl acetate | 85 |
| Methyl hexy ketone trimer | 15 |

Solvent, methyl ethyl ketone.

This composition was prepared in the same manner as the examples above and yielded a translucent, flexible film with nonbleeding characteristics similar to those of Example IX. In other experiments with polyvinyl acetate it was found that high flexibility could be obtained with considerably less plasticizer in this plastic than for polyvinyl chloride and the chloride-acetate copolymer, and also that the large proportions of trimer in the preceding examples of polyvinyl compounds produce sweating in the case of polyvinyl acetate.

EXAMPLE XVII

| | Parts |
|---|---|
| Chlorinated rubber | 70 |
| Methyl hexyl ketone trimer | 30 |

Solvent, benzene.

The compounding technique used was that of the previous examples on films and the product was a plastic dry film which showed no tendency to bleed.

EXAMPLE XVIII

| | Parts |
|---|---|
| Butadiene-styrene copolymer rubber | 50 |
| Methyl hexyl ketone trimer | 50 |

Solvent, benzene.

By following the procedure of Example IX with the materials listed here, a tacky and very plastic film was obtained that had no apparent disposition toward sweating.

EXAMPLE XIX

| | Parts |
|---|---|
| Polyvinyl chloride-acetate—"VYNW" grade | 20 |
| Methyl hexyl ketone trimer | 80 |

The plasticizing liquid was heated and the powdered vinyl polymer was dissolved directly in the hot ketone trimer. When the mass cooled, a translucent, rubbery, nonbleeding film was formed.

Table A

| Base Material | Parts of Ketone Trimer per 100 parts Base Material | | |
|---|---|---|---|
| | Minimum | Preferred Range | Maximum |
| Natural rubber | 1 | 1–25 | 25 |
| Reclaimed rubber | 1 | 1–25 | 25 |
| Hudrogenated rubber | 1 | 10–20 | 20 |
| Chlorinated rubber | 1 | 10–20 | 43 |
| Rubber hydrochloride | 1 | 10–20 | 20 |
| Polychloroprene | 0.5 | 1–15 | 40 |
| Butadiene-styrene copolymers | 1 | 5–15 | 40 |
| Butadiene-acrylonitrile copolymers | 1 | 5–20 | 30 |
| Butadiene-acrylonitrile-ketone copolymers | 1 | 15–20 | 20 |
| Butadiene-isobutylene copolymers | 0.5 | 1–5 | 11 |
| Polysulfide rubber | 0.5 | 1–5 | 10 |
| Polyvinyl chloride | 0.5 | [1] 1–150 | 150 |
| Polyvinyl acetate | 1 | 5–18 | 42 |
| Polyvinyl chloride-acetate | 0.5 | [1] 1–400 | 400 |

[1] 1 to 5 parts is the preferred range for relatively rigid products.

Table B

| Base Material | Parts of Base Material per Part of Ketone Trimer | | |
|---|---|---|---|
| | Minimum | Preferred Range | Maximum |
| Natural rubber | 4 | 4–100 | 100 |
| Reclaimed rubber | 4 | 4–100 | 100 |
| Hydrogenated rubber | 5 | 5–10 | 100 |
| Chlorinated rubber | 2.5 | 5–10 | 100 |
| Rubber hydrochloride | 5 | 5–10 | 100 |
| Polychloroprene | 2.5 | 7–100 | 200 |
| Butadiene-styrene copolymers | 2.5 | 7–20 | 100 |
| Butadiene-acrylonitrile copolymers | 3.3 | 5–20 | 100 |
| Butadiene-acrylonitrile-ketone copolymers | 5 | 5–7 | 100 |
| Butadiene-isobutylene copolymers | 9 | 20–100 | 200 |
| Polysulfide rubber | 10 | 20–100 | 200 |
| Polyvinyl chloride | 0.65 | [1] 0.65–200 | 200 |
| Polyvinyl acetate | 2.5 | 5.5–20 | 100 |
| Polyvinyl chloride-acetate | 0.25 | [1] 0.25–200 | 200 |

[1] 20 to 100 is the preferred range for relatively rigid products.

Since certain changes may be made in the above compositions of matter and different embodiments of the invention could be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which, as a matter of language, might be said to fall therebetween; and that they are intended to be inclusive in scope and not exclusive in that if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

Having described our invention, what we claim as new and desire to secure by Letters Patent is:

1. A composition of matter which comprises a polyvinyl compound of the group consisting of polyvinyl chloride, polyvinyl acetate, and vinyl chloride-acetate copolymers, and a quantity sufficient to plasticize the polyvinyl compound of a nondrying trimer of the group consisting of the trimers of methyl amyl ketone and methyl hexyl ketone produced by condensing the ketones by means of heat in the presence of a substantially anhydrous strong alkali.

2. A composition according to claim 1 in which the trimer is condensed from methyl hexyl ketone.

3. A composition of matter which comprises polyvinyl chloride and a quantity sufficient to plasticize the polyvinyl chloride of nondrying trimer of the group consisting of the trimers of methyl amyl ketone and methyl hexyl ketone produced by condensing the ketones by means of heat in the presence of a substantially anhydrous strong alkali.

4. A composition of matter which comprises 0.65 to 200 parts by weight of polyvinyl chloride and one part by weight of the nondrying trimer produced by condensing methyl hexyl ketone by means of heat in the presence of a substantially anhydrous strong alkali.

5. A composition of matter which comprises polyvinyl acetate and a quantity sufficient to plasticize the polyvinyl acetate of a nondrying trimer of the group consisting of the trimers of methyl amyl ketone and methyl hexyl ketone produced by condensing the ketones by means of heat in the presence of a substantially anhydrous strong alkali.

6. A composition of matter whch comprises 2.5 to 100 parts by weight of polyvinyl acetate and one part by weight of the nondrying trimer produced by condensing methyl hexyl ketone by means of heat in the presence of a substantially anhydrous strong alkali.

7. A composition of matter which comprises 5.5 to 20 parts by weight of polyvinyl acetate and one part by weight of the nondrying trimer produced by condensing methyl hexyl ketone by means of heat in the presence of a substantially anhydrous strong alkali.

8. A composition of matter which comprises copolymer of vinyl chloride-acetate and a quantity sufficient to plasticize the copolymer of a nondrying trimer of the group consisting of the trimers of methyl amyl ketone and methyl hexyl ketone produced by condensing the ketones by means of heat in the presence of a substantially anhydrous strong alkali.

9. A composition of matter which comprises 0.25 to 200 parts by weight of a copolymer of vinyl chloride-acetate and one part by weight of the nondrying trimer produced by condensing methyl hexyl ketone by means of heat in the presence of a substantially anhydrous strong alkali.

BERNARD A. DOMBROW.
JOHN J. MISKEL.

REFERENCES CITED

The following references are of record in the file of this patent:

UNITED STATES PATENTS

| Number | Name | Date |
|---|---|---|
| 2,145,464 | Steck et al. | Jan. 31, 1939 |
| 2,264,625 | Doolittle | Dec. 2, 1941 |
| 2,317,663 | Allen | Apr. 27, 1943 |
| 2,327,007 | Bent et al. | Aug. 17, 1943 |